United States Patent [19]

Kimura

[11] Patent Number: 4,861,477

[45] Date of Patent: Aug. 29, 1989

[54] TUBULAR CONTAINER FOR CENTRIFUGAL SEPARATION

[76] Inventor: Shiro Kimura, c/o Cosmic Inc. of Nadaya-BLDG. No. 50-5 Jingu-Mae, 5-chome, Shibuya-ku, Tokyo 150, Japan

[21] Appl. No.: 184,245

[22] Filed: Apr. 21, 1988

[30] Foreign Application Priority Data

Feb. 4, 1988 [JP] Japan .................................. 63-22829

[51] Int. Cl.[4] .............................................. B01D 33/00

[52] U.S. Cl. .................................... 210/359; 210/518; 422/72

[58] Field of Search ................... 210/359, 518; 422/72

[56] References Cited

U.S. PATENT DOCUMENTS 602,780 4/1898 Stokes .................................. 422/72

3,513,976 5/1970 James ................................. 210/782

FOREIGN PATENT DOCUMENTS 316828 5/1918 Fed. Rep. of Germany ........ 422/72

*Primary Examiner*—B. Nozick

*Attorney, Agent, or Firm*—Laff, Whitesel, Conte & Saret

[57] ABSTRACT

A tubular container for centrifugal separation suited for easy separation of a relatively small amount of the phase having an intermediate specific gravity from the heaviest and lightest phases. The container has a first section defining a bottom chamber of a certain volume for containing therein the heaviest phase, a second section contiguous to the first section and defining an intermediate chamber for containing therein the phase having the intermediate specific gravity, and a third section contiguous to the second section and defining an upper chamber for containing therein the lightest phase. The diameter of said second section is smaller than the diameters of the first and third sections.

2 Claims, 2 Drawing Sheets

TUBULAR CONTAINER FOR CENTRIFUGAL SEPARATION

BACKGROUND OF THE INVENTION

1. Field of the Invention

The present invention relates to an improvement in centrifuge tube. More particularly, it relates to a tubular container for centrifugal separation, which is conveniently used for separating a small amount of a phase having an intermediate specific gravity from the other phases of an emulsion. The tubular container of the invention may also be used for separating a small amount of a lighter particle component from a suspension. The tubular container of the invention is particularly suited for the separation of leukocyte from a blood.

2. Prior Art Statement

The centrifugal separation technique has been used to separate a small amount of a component having an intermediate specific gravity from a multi-phase liquid dispersion composed of plural liquid components which are not miscible with each other. The centrifugal separation technique may also be used to separate a small amount of a particle having a lower specific gravity from a suspension containing particles, for example cell or latex particles, having different specific gravities. However, when the amount of the objective component which is to be separated from the other components is very small relative to the amounts of the other components, the thickness of the layer of the objective component laid over the layer of the component having a higher specific gravity is so thin that collection by pipetting of the objective component layer is extremely difficult. For this reason, by the use of a conventional centrifuge tube, it is difficult to separate a small amount of a component having an intermediate specific gravity in pure state.

For instance, in clinical test for the diagnosis of leukemia of human being or animals, it is necessary to separate neutrophil, monocyte or lymphocyte from the peripheral blood and then subjected to test for examining the presence of cancer virus gene or the presence of abnormality in differentiation.

When the whole blood is subjected to centrifugal separation to separate the leukocyte fraction by applying a centrifugal force of, for example, in the order of 300 g ("g" stands for the acceleration of gravity), the leukocyte fraction which has a specific gravity slightly smaller than that of the erythrocyte fraction is separated to form a thin white layer (which is referred to as "buffy coat" in the art) over the erythrocyte fraction. However, since the quantity of buffy coat is small, the leukocyte fraction is apt to be contaminated with erythrocyte when it is picked up by means of a pipette or capillary. This poses a serious problem in the clinical test where a large quantity of leukocyte should be collected from a small quantity of blood. Although it is possible to allow leukocyte to float in the liquid fraction by the use of the Ficoll-Conray solution, the Ficoll-Conray solution is expensive and it should be removed after the completion of separation. Contaminating erythrocyte may be lysed by the use of a hemolysis reagent. However, the remaining hemoglobin must be removed by rinsing. Accordingly, there is a demand for a simplified technique for separating leukocyte without using any artifact in the diagnosis of the cell image and in the experimental cultivation of leukocyte.

OBJECTS AND SUMMARY OF THE INVENTION

The object of this invention is to provide a centrifuge tube which is conveniently used for separating a small amount of a phase having an intermediate specific gravity from the other phases of a multi-phase liquid dispersion.

Another object of this invention is to provide a centrifuge tube which is used for easy and effective separation of a small amount of a lighter particle component from a suspension, such as a suspension containing cells, colloidal particles or latex particles having different specific gravities.

A more specific object of this invention is to provide a tubular container which is particularly suited for separating leukocyte from blood without using any special reagent.

With the aforementioned objects in view, the present invention provides a tubular container for centrifugal separation characterized in that said container has a first section defining a bottom chamber of a certain volume for containing therein the heaviest phase, a second section contiguous to said first section and defining an intermediate chamber for containing therein the phase having the intermediate specific gravity, and a third section contiguous to said second section and defining an upper chamber for containing therein the lightest phase, the diameter of said second section being smaller than the diameters of said first and third sections.

According to another aspect of this invention, there is provided a tubular container for separating leukocyte from erythrocyte and plasma by centrifugal separation, characterized in that said container has a first section defining a bottom chamber of a certain volume for containing therein erythrocyte, a second section contiguous to said first section and defining an intermediate chamber for containing therein leukocyte, and a third section contiguous to said second section and defining an upper chamber for containing therein plasma, the diameter of said second section being smaller than the diameters of said first and third sections.

In a preferred embodiment, the volume of said first section is variable.

By the provision of an intermediate section having a diameter which is significantly smaller than those of the bottom and top sections, the phase or component having an intermediate specific gravity is contained in the intermediate section of prolonged length to facilitate easy pipetting.

DESCRIPTION OF PREFERRED EMBODIMENTS

Figure 1:
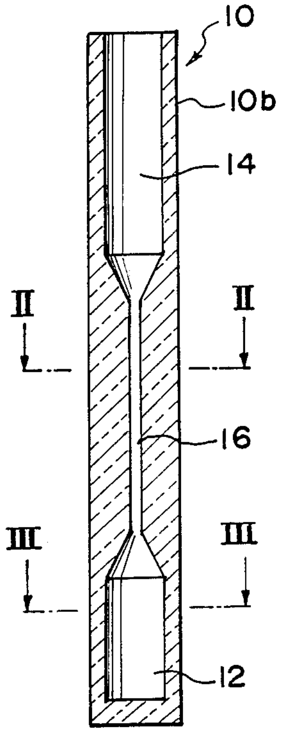
FIG. 1 is a sectional view of a first embodiment of this invention.
Figure 2:
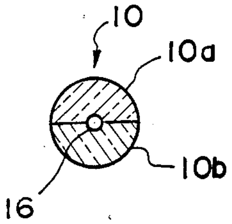
FIG. 2 is a cross-sectional view taken along line II—II of FIG. 1.
Figure 3:
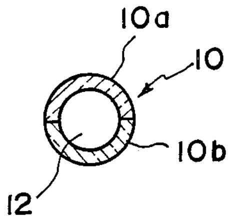
FIG. 3 is a cross-sectional view taken along line III—III of FIG. 1.

The present invention will now be described with reference to the preferred embodiments shown in FIGS. 1 to 5. In the following description, the preferred embodiments of this invention are used for separating leukocyte from blood. However, it is to be noted that the centrifuge tube of this invention may also be used for other applications.

In FIGS. 1 to 5, a centrifuge tube of the invention is generally denoted by reference numeral 10, and is formed by adjoining paired semicylindrical blocks 10*a* and 10*b*. The blocks 10*a* and 10*b* may be made of a transparent material which withstands the centrifugal separation force and does not affect the blood cells. It is desirous that the material for the tube 10 is selected so that the blood cells do not adhere to the interior wall of the tube 10. Examples of preferable material for the blocks 10*a* and 10*b* are synthetic resins, such as polyvinyl chloride and polyethylene.

The tube 10 has a closed bottom end, and a first section 12 for containing therein erythrocyte at the lower portion thereof. The first or bottom section 12 has a relatively large volume and a relatively large diameter. The tube 10 has an open top end, and a third section 14 for containing therein plasma at the upper portion thereof. The first and third sections are communicated with each other by a second section 16 which has a diameter smaller than those of the first and third sections 12, 14. Leukocyte separated from the blood is contained in the second section 16.

Figure 5:
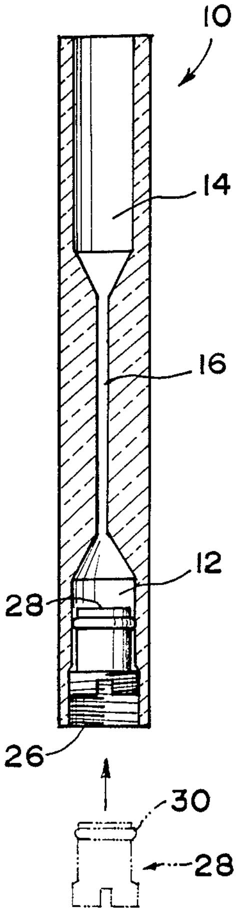
FIG. 5 is a sectional view of a second embodiment of this invention.

It is preferred that the diameter of the second section 16 is small enough for easy separation of leukocyte, but is large enough for allowing insertion of a capillary pipette for picking up the separated leukocyte. The diameter of the second section 16 ranges preferably from 1.5 to 2.0 mm. The volume of the second section 16 is determined by the prolonged length thereof, and may be set in consideration of the volume of the first section 12. The volume of the third section 14 may be determined in consideration of the volumes of the first and second sections 12, 16 and also in consideration of the volume of the whole blood to be charged in the tube 10. The diameters of the first and third sections 12, 14 are significantly larger than the diameter of the second section 16. For easy pipetting of the leukocyte layer from the second section 16 after the centrifugal separation, the upper portion of the first section 12 and the lower portion of the third section 14 are converged to form generally conical connecting portions, as shown in FIGS. 1 and 5. With this configuration, the separated leukocyte layer may be easily pipetted even when the leukocyte layer comes into either or both of the first and third sections 12, 14. For example, when the tube 10 is designed to contain about 3 to 5 ml of blood, the first section 12 for containing therein the separated erythrocyte layer has a diameter of 10 mm and a volume of about 2.2 ml, the second section 16 for containing therein the separated leukocyte layer has a diameter of 1.5 mm, a prolonged length of about 40 mm and a volume of about 0.07 ml, and the third section 14 for containing therein the plasma layer has a diameter of 10 mm and a volume of about 3 ml.

In order to ensure that the separated leukocyte layer 22 is contained always in the second section 16, graduation marks 18 are provided on the exterior wall of the tube 10 (see FIG. 4) of this embodiment. The blood to be subjected to centrifugal separation is charged in the tube 10 so that the liquid surface of the charged blood is agreed with the hemacrit value measured by the preliminary experiment which will be described hereinafter.

Figure 4:
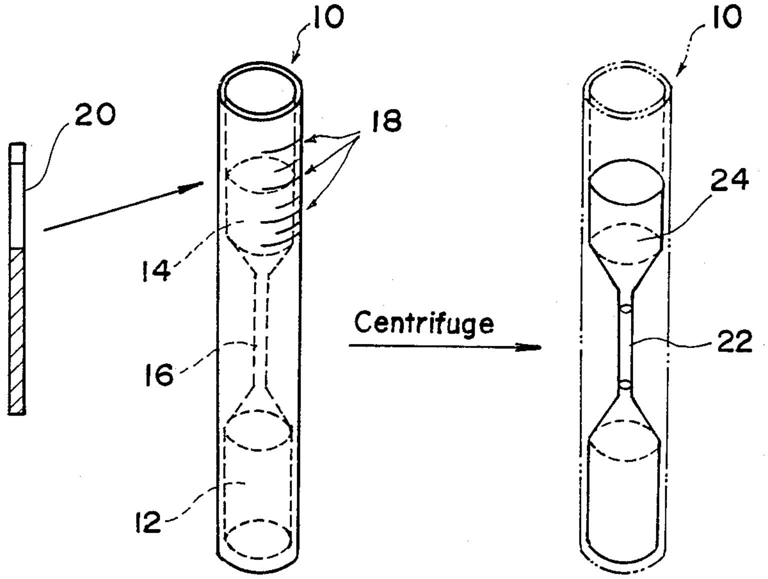
FIG. 4 is a schematic illustration of the first embodiment which is used for the separation of leukocyte from blood.

The operation of centrifugal separation of whole blood by the use of this embodiment will now be described with reference to FIG. 4.

An anti-coagulant, such as heparin or citric acid, is added to the whole blood and sucked into a hemacrit capillary 20. One end of the hemacrit capillary 20 is sealed by a putty, and the blood is subjected to centrifugal separation by applying a centrifugal force which is the same as that applied at the later operation carried out by using the centrifuge tube 10. The time of this preliminary centrifugal separation should be the same as that of the later operation carried out by using the centrifuge tube 10. The sample blood is charged into the tube 10 so that the liquid surface is agreed with the graduation 18 corresponding to the hemacrit value, i.e. (Length of the Erythrocyte Layer)/(Length of the Whole Blood). The charged blood is then subjected to centrifugal separation, for example, by applying 300 g for 5 to 10 minutes. The leukocyte layer 22 under the plasma layer 24 and contained in the second section 16 is picked up by using a capillary, and then subjected to subsequent diagnosis or examination.

By the use of the tubular container 10 for centrifugal separation, according to the first embodiment of this invention, the leukocyte layer can be effectively and easily separated and then picked up after a simple preliminary experiment without using any special reagent.

FIG. 5 is a sectional view of a second embodiment of this invention. In this second embodiment, the bottom end of the tube 10 is closed by a movable plug 28. In detail, the bottom end 26 of the tube 10 beneath the first section 12 for containing therein erythrocyte is opened, and the inner periphery of the bottom end 26 is threaded. The plug 28 is screw fitted with the thread to be thrusted into and retracted from the first section 12. A seal ring 30 is provided on the exterior periphery of the top end of the plug 28 for sealing the bottom of the first section 12. In this second embodiment, the volume of the first section 12 for containing therein the erythrocyte is thus varied depending on the hemacrit value determined by the preliminary experiment so that the leukocyte layer 22 is contained in the second section 16.

The second embodiment may also be used a follows. A proper quantity of whole blood is charged into the tube 10, followed by centrifugal separation, without conducting the preliminary experiment for finding out the hemacrit value. If the separated leukocyte layer 22 is contained in the second section 16, the leukocyte layer 22 is picked up directly. If the separated leukocyte layer 22 is contained in the first section 12 or the third section 14, the plug 28 is moved upwards or downwards so that the separated leukocyte layer 22 is contained in the second section 16. As the leukocyte is contaminated with erythrocyte or a portion of leukocyte adheres to the interior wall of the centrifuge tube 10, the purity and the yield of leukocyte is lowered thereby. By subjecting the content in the tube 10 to repeated centrifugal separation, pure leukocyte layer 22 is contained in the second section 16 and then picked up separately at a high yield. The preliminary experiment can thus be omitted and the leukocyte fraction can be effectively picked up in a pure state only by subjecting the content in the centrifuge tube 10 to repeated centrifugal separation steps.

In the operation described above, the blood has been collected using a separate blood collecting tube, and then transferred into the centrifuge tube 10. However, the top opening of the tube 10 may be sealed and the interior of the tube 10 is evacuated to be used as an evacuated blood collecting tube. Collection of blood and separation of leukocyte may be further simplified by the use of such an evacuated centrifuge tube.

The embodiments of the invention are particularly suited for separating leukocyte from a blood. However they may be used also as centrifuge tubes for separating a small amount of a component or phase having an intermediate or lower specific gravity from a suspension composed of plural particle components, such as cells, colloidal particles or latex particles, having different specific gravities. The embodiment of this invention may also be used for separating a small amount of a liquid phase having an intermediate specific gravity from relatively large amounts of heavier and lighter liquid phases of a multi-phase liquid dispersion. The material for the centrifuge tube 10 may be changed depending on the property of the multi-phase liquid dispersion or suspension to be charged into the tube. If the ratio of the component to be contained in the second section 16 is known, the volume of the second section 16 may be properly selected for precise separation thereof.

In the illustrated embodiments, the centrifuge tube 10 has a generally cylindrical contour. However, the tube may have a generally square section.

Since the centrifuge tube of this invention has an intermediate section having a diameter smaller than those of the upper and bottom sections, a small amount of the component having an intermediate specific gravity can be separated in the condition for easy collection thereof by pipetting. By the use of the centrifuge tube of this invention, leukocyte can be separated effectively and collected easily without using any special reagent.

What is claimed is:

1. A tubular container for centrifugal separation of a specimen characterized in that said container has a first section defining a bottom chamber of a certain volume for containing therein a heaviest phase of said specimen, a second section contiguous to said first section and defining an intermediate chamber for containing therein a phase of said specimen having an intermediate specific gravity, a third section contiguous to said second section and defining an upper chamber for containing therein a lightest phase of said specimen, said second section having a diameter which is smaller than diameters of said first and third sections, and means for adjustably positioning a movable plug fitted into and sealing a bottom of said first section, said plug being adjustably positioned over a predetermined distance to be moved into or out of said section in order to vary the volume thereof.

2. A tubular container for separating leukocyte from erythrocyte and plasma by a centrifugal separation, characterized int hat said container has a first section defining a bottom chamber of a certain volume for containing said erythrocyte therein, a second section contiguous to said first section and defining an intermediate chamber for containing said leukocyte therein, a third section contiguous to said second section and defining an upper chamber for containing said plasma therein, said second section having a diameter which smaller than diameters of both said first and third sections, and means for adjustably positioning a movable plug fitted into and sealing a bottom of said first section, said plug being continuously movably throughout an entire predetermined distance along an inner wall of said first section in order to vary the volume thereof.

* * * * *